United States Patent [19]

Coffey et al.

[11] Patent Number: 4,459,394

[45] Date of Patent: Jul. 10, 1984

[54] PREPARATION OF NYLON POLYAMIDE WITH COBALT SALT

[75] Inventors: Gerald P. Coffey, Lyndhurst; Rimvydas L. Cepulis, Euclid; Benedict S. Curatolo, Bedford Hts., all of Ohio

[73] Assignee: The Standard Oil Company, Cleveland, Ohio

[21] Appl. No.: 335,907

[22] Filed: Dec. 30, 1981

[51] Int. Cl.³ .................. C08G 69/00; C08G 69/08; C08G 69/16

[52] U.S. Cl. ...................... 526/90; 526/172; 526/311; 528/310; 528/318; 528/319; 528/323; 528/363

[58] Field of Search .................. 526/172, 90, 311; 528/310, 318, 319, 363, 323

[56] References Cited

U.S. PATENT DOCUMENTS

| | | | |
|---|---|---|---|
| 2,691,643 | 10/1954 | Chirtel et al. | 260/78 R |
| 2,749,331 | 6/1956 | Breslow | 260/89.7 |
| 3,499,879 | 3/1970 | Kobayashi et al. | 260/88.7 |
| 3,629,203 | 12/1971 | Volker et al. | 260/78 A |
| 4,283,524 | 8/1981 | Greene | 528/363 |

OTHER PUBLICATIONS

Korshak et al.—Synthetic Hetero-Chain Polyamides, 1964, p. 9.

Primary Examiner—Harold D. Anderson
Attorney, Agent, or Firm—Larry W. Evans; John E. Miller, Jr.; David P. Yusko

[57] ABSTRACT

A polyamide is produced by polymerizing at least one of alpha, beta unsaturated carboxylic acid, an ammonium salt of an alpha, beta unsaturated carboxylic acid, an alpha, beta unsaturated nitrile and water, a beta-amino propionic acid or alkyl derivative thereof and an alpha, beta unsaturated amide and ammonia in the presence of a catalyst containing cobalt. Preferred catalysts comprise cobaltous carboxylates and cobaltic salts of the enol of beta-di-ketones.

15 Claims, No Drawings

PREPARATION OF NYLON POLYAMIDE WITH COBALT SALT

BACKGROUND OF THE INVENTION

This invention relates to new catalysts useful for the preparation of polyamides. More particularly, this invention relates to the preparation of a polyamide by polymerizing at least one of an alpha, beta unsaturated carboxylic acid and ammonia, an ammonium salt of an alpha, beta unsaturated carboxylic acid, an alpha, beta unsaturated nitrile and water, a beta-amino propionic acid or its alkyl derivatives and an alpha, beta unsaturated amide and ammonia in the presence of a catalyst comprising either a cobaltous salt of a carboxylic acid or a cobaltic salt of the enol of beta-di-ketone.

It is known that polyamides can be prepared from various monomers. For example, U.S. Pat. No. 4,283,524 describes a process wherein polyamides are prepared from the ammonium salts of alpha, beta unsaturated monocarboxylic acids. U.S. Pat. No. 2,691,643 teaches that polyamides can be prepared by the thermal condensation of beta-amino propionic acid. U.S. Pat. Nos. 3,629,203 and 3,499,879 relate to the preparation of polyamides by the condensation reaction of acrylonitrile. U.S. Pat. No. 2,749,331 teaches that polyamides can be prepared from acrylamide. However, each of these processes is deficient in that the polymide produced has very low molecular weight.

It is an object of this invention to provide a novel catalytic process to produce polyamides which have a high degree of polymerization. Moreover, by using a catalyst system in the reaction, the rate of the polymerization reaction is remarkably increased and the reaction period is greatly shortened.

SUMMARY OF THE INVENTION

It has now been discovered that a polyamide can be produced by polymerizing at least one of an alpha, beta unsaturated carboxylic acid and ammonia, an ammonium salt of an alpha, beta unsaturated carboxylic acid, an alpha, beta unsaturated nitrile and water, beta-amino propionic acid or alkyl derivatives thereof and an alpha, beta unsaturated amide and ammonia in the presence of a catalyst comprising a cobaltic salt of the enol of beta-di-ketone. It has also been discovered that the cobaltous salt of a carboxylic acid will catalyze this reaction.

In particular, the inventive process results in a polyamide with a high degree of polymerization when ammonium methacrylate is polymerized in the presence of a cobaltic salt of the enol of beta-di-ketone.

DETAILED DESCRIPTION

The Polymer

The polyamides obtained by the process of this invention are characterized as containing ethylene amido linkages in the polymer backbone. These ethylene amido linkages are generally defined as having repeating units as follows:

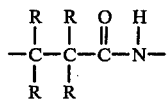

wherein each R is a suitable substituent which, in the simplest embodiment of the invention, would all be hydrogen. These ethylene amido linkages comprise the basic structure of a nylon-3 type polyamide.

These polyamides may also contain other carbonamide structural units. The carbonamide structural unit will vary depending on the particular monomer or monomers used in the polymerization. For example, the carbonamide unit may comprise a nylon-6 type unit which has the following formula:

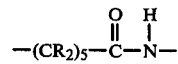

wherein each R is a suitable substituent which, in the simplest embodiment of the invention, would all be hydrogen. Other carbonamide units such as nylon-4 precursors, nylon-11 precursors, nylon-6,6 precursors, nylon-6,10 precursors, nylon-7 precursors, nylon-8 precursors and nylon-12 precursors may be contained in the polyamide of this invention. The properties of the resultant polyamide will depend on the type of monomer of monomers used and the ratio of the various monomers.

While this invention is directed principally to polyamides, it also includes within its ambit polyamides the polymer chains of which are formed from the above units together with other units which may be introduced into the chain, for example, by adding suitable copolymerizable monomers to the polymerization mixture.

The Process

The formation of polyamides from an alpha, beta unsaturated carboxylic acid and ammonia, an ammonium salt of an alpha, beta unsaturated carboxylic acid, an alpha, beta unsaturated nitrile and water, a beta-amino propionic acid or alkyl derivatives thereof and an alpha, beta unsaturated amide and ammonia are all known. Examples of carboxylic acids that are within the scope of this invention include acrylic acid, methacrylic acid and crotonic acid. Examples of ammonium salts of alpha, beta unsaturated carboxylic acids which are included within the scope of this invention are ammonium acrylate, ammonium methacrylate and ammonium crotonate. Examples of alpha, beta unsaturated nitriles which are within the scope of this invention include acrylonitrile and methacrylonitrile. Examples of beta-amino propionic acid or alkyl derivatives thereof which are within the scope of this invention include beta-alanine and alpha-methyl-beta-alanine. Examples of alpha, beta unsaturated amides that are within the scope of this invention include acrylamide and methacrylamide. Each of these reactions is well known in the art.

This polymerization can be conducted under a broad range of process conditions which are generally known in the prior art. In the preferred practice of the invention, monomer or monomers are maintained at a temperature above their melting points but below the decomposition temperature of the products. It is generally preferred to conduct the process at a temperature between 100° and 300° C., and conducting the process between 135° and 200° C. is most preferred.

The temperature and amount of time required for polymerization are interrelated. At low temperatures it will take longer for a polymer to form than at high temperatures. In general, the reaction is conducted in less than 48 hours, with times ranging from 2 to 20 hours normally being adequate to produce the polyamide.

Although this polymerization can take place in an open container in contact with the atmosphere, it is preferred to carry out the polymerization in the absence of oxygen. This can be achieved by blanketing the reaction mixture with either an inert gas such as nitrogen or with a gaseous monomer, e.g. ammonia.

This reaction can proceed at atmospheric, superatmospheric or subatmospheric pressure. Normally, sufficient pressure is required to maintain the volatile ingredients in the liquid state under the polymerization conditions and to control the concentration of gaseous ingredients. Thus, the polymerization normally takes place under superatmospheric pressure. After the polymerization has proceeded for a suitable time, the pressure can be lowered to pull off water and other volatiles.

Another important factor in the conduct of the polymerization is the extent to which the reactants are able to physically contact each other so that the desired reaction can occur. Various solvents and liquid dispersions are helpful in improving the contacting. It has also been found that ammonia and/or water can be added to improve the conversion of the monomers to high molecular weight polymer.

This polymerization process can proceed by any of the generally known modes of polymerization including bulk, slurry, suspension or solution polymerization by batch, continuous or intermittant addition of the monomers and other components. The polyamides produced have a wide variety of applications. Generally, they may be used in any application calling for a nylon type polymer. For example, these polyamides can be used as fibers, plastics, films and molding resins.

The Catalyst

The catalyst useful in the inventive process can comprise either a cobaltic salt of the enol of beta-di-ketone or a cobaltous salt of a carboxylic acid. It is necessary for the catalyst to contain either a bivalent (cobaltous) or trivalent (cobaltic) cobalt ion.

The cobaltic salt of the enol of beta-di-ketone can be represented by the following structure:

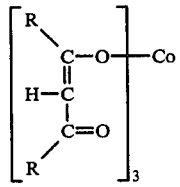

wherein each R is independently selected from an alkyl or aryl group. Preferably, each R is selected from the group consisting of a $C_{1-4}$ alkyl or phenyl and most preferably each R is a methyl group. Examples of cobaltic salts which can be used to catalyze the above described reaction include cobalt (III) dibenzoylmethane, cobalt (III) acetylbenzoylmethane, cobalt (III) ethylacetoacetate, cobalt (III) 3-methylbut-1-en-3yl acetoacetate and cobalt (III) acetylacetonate.

The cobaltous salts of carboxylic acids are also useful for preparing polyamides. The preferred cobaltous salt has the following structure

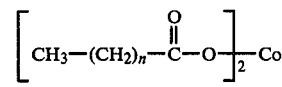

wherein n is 1 to 12, preferably 4 to 9. Especially preferred is the cobaltous salt of 2-alkyl hexanoic acid wherein the alkyl is preferably ethyl. Examples of cobaltous salts which can be used for the above reaction include cobalt (II) 2-ethyl hexanoate, cobalt (II) acetate, cobalt (II) cyclohexane butyrate, cobalt (II) formate, cobalt (II) oleate, cobalt (II) benzoate, cobalt (II) naphthenate, cobalt (II) citrate, cobalt (II) resinate and cobalt (II) oxalate.

The cobalt catalyst described above can be used in any amount which will catalyze the reaction. Preferably, catalyst concentrations between 0.05 to 5.0 mole percent, based on the amount of monomer in the reaction, can be used. It is especially preferred to use between 0.05 and 1.0 mole percent.

SPECIFIC EMBODIMENTS

In order to provide a better understanding of the present invention, the following working examples are presented.

Comparative Examples A–J and Examples 1–18

An ammonium salt was prepared by adding glacial methacrylic or acrylic acid to excess liquid ammonia and allowing the excess ammonia to evaporate. This salt was kept in a tightly capped jar to prevent deterioration. The monomers, e.g. ammonium salt and caprolactam, were added to a 25 ml glass ampoule. The catalyst was then added to this ampoule. The total monomer charge was 0.04 moles. The monomers were stirred and the ampoule was evacuated and repressured three times and then sealed with a flame. The ampoule was placed in an oven at 175° C. for 16 hours. The ampoule was then cooled, opened carefully and 5 ml of 90% formic acid was added. The ampoules were then placed in an ultrasonic bath containing water at 50° to 60° C. Solutions formed which were filtered and then added dropwise at 150 ml of stirred acetone at room temperature to precipitate the polymer.

The polymer was filtered, washed with 20 ml of acetone and dried in a vacuum oven overnight at 55° C. The resins were then dissolved in 90% formic acid for determination of bulk viscosity. The time required for this solution to traverse 0.8 ml in a 1.0 ml graduated pipette was called the bulk viscosity. Intrinsic viscosities were determined for some of the polymers in 90% formic acid at 25° C.

The results of these experiments are shown in Table I. These examples show that the bulk and intrinsic viscosity, which are directly related to molecular weight, are improved greatly when either a cobaltic salt of the enol of beta-di-ketone or the cobaltous salt of a carboxylic acid is added to the monomer mixture.

Example 19

A polyamide was also prepared by adding 35.54 gms (0.5 mole) of acrylamide, 56.6 gms (0.5 mole) of caprolactam, 33.4 gms of aqueous ammonia (28% $NH_3$), 0.92 gms of p-methoxyphenol and 0.356 gms (0.001 mole) of cobalt (III) acetylacetomate to a reaction container. The amount of water in the aqueous ammonia corresponds to about 26 weight percent based on the weight of the monomers. The reaction container was placed into a Parr autoclave and purged with nitrogen. The autoclave was sealed and heated for 4 hours at 190° C.

Infrared and NMR spectroscopy confirmed that the resultant resin was a polyamide containing ethylene amido linkages. The intrinsic viscosity, determined in a 90% formic acid solution at 25° C. was 0.71 dl/g.

pha,beta-unsaturated monocarboxylic acid in contact with a catalyst comprising either a cobaltous salt of a carboxylic acid or a cobaltic salt of the enol of a beta-diketone.

2. The process of claim 1 wherein the catalyst comprises the cobaltic salt of the enol of a beta-di-ketone.

3. The process of claim 2 wherein the catalyst com-

TABLE I

| Example | Monomers | Monomer Ratio | Catalyst | Catalyst Amount (Mole %) | Bulk Viscosity (Seconds) | Intrinsic Viscosity (dl/g) |
|---|---|---|---|---|---|---|
| A | Ammonium methacrylate/caprolactam | 80/20 | None | — | 2.0 | 0.07 |
| B | Ammonium methacrylate/caprolactam | 80/20 | Cobalt (II) acetylacetonate | 1.0 | 1.7 | (1) |
| C | Ammonium methacrylate/caprolactam | 80/20 | Nickel acetylacetonate | 5.0 | (2) | 0.07 |
| D | Ammonium methacrylate/caprolactam | 80/20 | Magnesium acetylacetonate | 5.0 | (2) | 0.07 |
| E | Ammonium methacrylate/caprolactam | 80/20 | Molybdenum acetylacetonate | 5.0 | 2.0 | |
| 1 | Ammonium methacrylate/caprolactam | 80/20 | Cobalt (III) acetylacetonate | 5.0 | 352.0 | 0.89 |
| 2 | Ammonium methacrylate/caprolactam | 80/20 | Cobalt (III) acetylacetonate | 1.0 | 229.0 | 0.90 |
| 3 | Ammonium methacrylate/caprolactam | 80/20 | Cobalt (III) acetylactonate | 0.1 | 163.0 | 0.94 |
| 4 | Ammonium methacrylate/caprolactam | 80/20 | Cobalt (III) acetylacetonate | 0.05 | 8.0 | 0.23 |
| 5 | Ammonium methacrylate/caprolactam | 80/20 | Cobalt (III) acetylacetonate | 0.01 | 1.8 | (1) |
| 6 | Ammonium methacrylate/caprolactam | 90/10 | Cobalt (III) acetylacetonate | 5.0 | 520.0 | 0.50 |
| 7 | Ammonium methacrylate/caprolactam | 90/10 | Cobalt (III) acetylacetonate | 0.5 | 181.0 | 0.65 |
| 8 | Ammonium methacrylate/caprolactam | 90/10 | Cobalt (III) acetylacetonate | 0.05 | 3.5 | 0.12 |
| 9 | Ammonium methacrylate/caprolactam | 90/10 | Cobalt (III) acetylacetonate | 0.01 | 1.7 | (1) |
| 10 | Ammonium acrylate/caprolactam | 26/74 | Cobalt (III) acetylacetonate | 1.0 | 17.0 | 0.39 |
| 11 | Ammonium acrylate/caprolactam | 44/56 | Cobalt (III) acetylacetonate | 1.0 | 32.0 | 0.58 |
| 12 | Ammonium acrylate/caprolactam | 65/35 | Cobalt (III) acetylacetonate | 1.0 | 61.0 | 0.64 |
| F | Ammonium methacrylate/caprolactam | 80/20 | Aluminum octoate | 5.0 | 2.0 | (1) |
| G | Ammonium methacrylate/caprolactam | 80/20 | Zinc (II) stearate | 1.0 | 1.7 | (1) |
| H | Ammonium methacrylate caprolactam | 80/20 | Copper (II) stearate | 1.0 | 1.7 | (1) |
| I | Ammonium methacrylate/caprolactam | 80/20 | Manganese (II) stearate | 1.0 | 1.7 | (1) |
| J | Ammonium methacrylate/caprolactam | 80/20 | Cobalt (II) tungstate | 5.0 | 1.9 | (1) |
| 13 | Ammonium methacrylate/caprolactam | 80/20 | Cobalt (II) octoate | 1.0 | 32.4 | 0.40 |
| 14 | Ammonium methacrylate/caprolactam | 80/20 | Cobalt (II) octoate | 0.5 | 27.0 | 0.30 |
| 15 | Ammonium methacrylate/caprolactam | 80/20 | Cobalt (II) octoate | 0.1 | 22.9 | 0.35 |
| 16 | Ammonium methacrylate/ammonium acrylate/caprolactam | 40/40/20 | Cobalt (II) octoate | 5.0 | 11.0 | (1) |
| 17 | Ammonium methacrylate | 100 | Cobalt (II) ocoate | 5.0 | 15.7 | 0.23 |
| 18 | Ammonium methacrylate/caprolactam | 90/10 | Cobalt (II) octoate | 5.0 | 37.0 | 0.34 |

(1) Intrinsic viscosity not determined.
(2) Insufficient material for bulk viscosity determination.

It was determined by infrared spectroscopy that each of the polyamides formed in the above examples contained ethylene amido linkages. Thus, the polyamides comprised a nylon-3 type polymer or copolymer.

The cobaltous, nickel, magnesium and molybdenum salts of the enol of beta-di-ketones showed no catalytic effect. The molecular weight of the polyamide was substantially improved when a catalyst comprising the cobaltic salts of the enol of beta-di-ketone was used. It is clear that the cobaltic ion is very active in increasing the viscosity and, thus, the molecular weight of polyamides.

The aluminum, zinc, copper and manganese salts of carboxylic acids showed no catalytic effect in the instant polymerization. The molecular weight of the polyamide was substantially improved when a catalyst comprising the cobaltous salt of a carboxylic acid was used. The catalytic activity of this cobaltous salt shows little dependence on concentration over a wide concentration range. Other cobaltous compounds, such as the cobaltous salts of the enol of beta-di-ketone and cobaltous tungstate showed no catalytic activity.

Although only a few embodiments of this invention have been specifically described above, it should be appreciated that many additions and modifications can be made without departing from the spirit and scope of the invention. These and all other modifications are intended to be included within the scope of this invention, which is to be limited only by the following claims.

We claim:

1. A process for preparing a nylon type polyamide comprising polymerizing an ammonium salt of an alpha,beta-unsaturated monocarboxylic acid in contact with a catalyst comprising either a cobaltous salt of a carboxylic acid or a cobaltic salt of the enol of a beta-diketone.

prises one or more of cobalt (III) dibenzoylmethane, cobalt (III) acetylbenzoylmethane, cobalt (III) ethylacetylacetate, cobalt (III) 3-methylbut-1-en-3yl acetylacetate, cobalt (III) acetylacetonate.

4. The process of claim 3 wherein the catalyst comprises the cobaltic salt of acetylacetone.

5. The process of claim 1 wherein the catalyst comprises the cobaltous salt of a carboxylic acid.

6. The process of claim 5 wherein the catalyst is selected from the group consisting of cobalt (II) acetate, cobalt (II) cyclohexanebutyrate, cobalt (II) formate, cobalt (II) oleate, cobalt (II) benzoate, cobalt (II) naphthenate, cobalt (II) citrate, cobalt (II) resinate and cobalt (II) oxalate or cobalt (II) octoate.

7. The process of claim 6 wherein the catalyst comprises cobaltous octoate.

8. The process of claim 1 wherein the ammonium salt is selected from the group consisting of ammonium acrylate and ammonium methacrylate.

9. The process of claim 1 wherein the ammonium salt is prepared by the in situ reaction of an alpha,beta-unsaturated monocarboxylic acid and ammonia.

10. The process of claim 9 wherein the monocarboxylic acid is selected from the group consisting of methacrylic acid and acrylic acid.

11. The process of claim 1 wherein the catalyst concentration is between 0.05 to 5.0 mole percent based on the moles of monomer in the reaction.

12. The process of claim 1 wherein the catalyst concentration is between 0.05 to 1.0 mole percent based on the total moles of monomer in the polymerization system.

13. The process of claim 1 wherein the polyamide contains in its backbone ethylene amido units of the following structure:

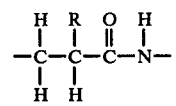

wherein R is an alkyl radical.

14. The process of claim 13 wherein R is methyl.

15. The process of claim 1 wherein an ammonium salt of an alpha,beta-unsaturated monocarboxylic acid and caprolactam are polymerized.

* * * * *